United States Patent
Ray et al.

(10) Patent No.: US 12,307,097 B1
(45) Date of Patent: May 20, 2025

(54) SYSTEMS AND METHODS FOR SANITIZATION OF MULTI-LEVEL CELL (MLC) MEMORY

(71) Applicants: Biswajit Ray, Madison, AL (US); Aleksandar Milenkovic, Madison, AL (US); Md Raquibuzzaman, Huntsville, AL (US); Matchima Buddhanoy, Huntsville, AL (US)

(72) Inventors: Biswajit Ray, Madison, AL (US); Aleksandar Milenkovic, Madison, AL (US); Md Raquibuzzaman, Huntsville, AL (US); Matchima Buddhanoy, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 6 days.

(21) Appl. No.: 18/103,916

(22) Filed: Jan. 31, 2023

Related U.S. Application Data

(60) Provisional application No. 63/305,006, filed on Jan. 31, 2022.

(51) Int. Cl.
  *G06F 3/06* (2006.01)
(52) U.S. Cl.
  CPC .......... *G06F 3/0616* (2013.01); *G06F 3/0623* (2013.01); *G06F 3/0659* (2013.01); *G06F 3/0679* (2013.01)

(58) Field of Classification Search
  CPC .... G06F 3/0616; G06F 3/0623; G06F 3/0659; G06F 3/0679
  See application file for complete search history.

(56) References Cited

U.S. PATENT DOCUMENTS

| | | | |
|---|---|---|---|
| 5,321,241 | A | 6/1994 | Craine |
| 5,652,803 | A | 7/1997 | Tachikawa |
| 6,442,644 | B1 | 8/2002 | Gustavson |
| 6,659,353 | B1 | 12/2003 | Okamoto |
| 7,415,732 | B2 | 8/2008 | Montecalvo |

(Continued)

OTHER PUBLICATIONS

Guin, et al., "Counterfeit Integrated Circuits: A Rising Threat in the Global Semiconductor Supply Chain," Proceedings of the IEEE, Aug. 2014, pp. 1207-1228, vol. 102, No. 8.

(Continued)

*Primary Examiner* — Larry T MacKall
(74) *Attorney, Agent, or Firm* — Butler Snow LLP; Jon E. Holland

(57) ABSTRACT

A system for performing sanitization of multi-level cell (MLC) memory has a memory controller configured to read and buffer at least a first page of MLC memory that shares MLCs with at least a second page. The memory controller sanitizes the second page by performing at least one write operation to adjust the charge levels in the MLCs so that each bit of the second page is forced to the same value or to a value that mirrors the value of another bit of the same cell. Thus, for multiple pages sharing the same MLCs, the data of at least one page can be sanitized while the data of at least one other page is retained. Such sanitizing can be achieved without having to perform an erase operation, thereby helping to prevent or reduce memory degradation.

18 Claims, 7 Drawing Sheets

(56) References Cited

U.S. PATENT DOCUMENTS

| | | | |
|---|---|---|---|
| 8,572,440 | B1 | 10/2013 | Nunally |
| 9,575,125 | B1 | 2/2017 | Andre |
| 9,972,396 | B1* | 5/2018 | Naik ............... G11C 11/5635 |
| 10,204,008 | B2 | 2/2019 | Trezise |
| 10,223,199 | B2 | 3/2019 | Hahn |
| 11,177,003 | B1 | 11/2021 | Ray |
| 2007/0043667 | A1 | 2/2007 | Qawami |
| 2007/0079387 | A1 | 4/2007 | Montecalvo |
| 2008/0082872 | A1 | 4/2008 | Nagasaka |
| 2010/0124108 | A1 | 5/2010 | Sarin |
| 2010/0125765 | A1 | 5/2010 | Orbach |
| 2012/0166814 | A1 | 6/2012 | Hayashi |
| 2014/0075051 | A1 | 3/2014 | Zadesky et al. |
| 2014/0143619 | A1 | 5/2014 | Gorman |
| 2016/0034217 | A1 | 2/2016 | Kim |
| 2018/0158493 | A1 | 6/2018 | Ryu |
| 2020/0363980 | A1* | 11/2020 | Muthiah ............... G06F 3/0616 |
| 2020/0372967 | A1 | 11/2020 | Rahman |

OTHER PUBLICATIONS

Guin, et al., "Counterfeit IC Detection and Challenges Ahead," Jan. 2013, ACM SIGDA Newsletter, pp. 1-6.

Guo, et al., "FFD: A framework for Fake Flash Detection," Jun. 2017, ACM, pp. 1-6.

Wang, et al., Flash Memory for Ubiquitous Hardware Security Functions: True Random No. Generation and Device Fingerprints, 2012, IEEE, pp. 33-47.

Kumari, et al., Independent Detection of Recycled Flash Memory: Challenges and Solutions, 2018, IEEE, pp. 89-95.

Wei, et al., "Reliably Erasing Data from Flash-based Solid State Drives," Proceedings of the 9th USENIX Conference on File and Storage Technologies, 2011, pp. 1-13.

Lee, et al., "Secure Deletion for NAND Flash File Systems," ACM Symposium on Applied Computing, 2008, pp. 1710-1714.

Reardon, et al., "Data Node Encrypted File System: Efficient Secure Deletion for Flash Memory," 21st USENIX Security Symposium, 2012, pp. 333-348.

Reardon, et al., "On Secure Data Deletion," IEEE Symposium on Security and Privacy, vol. 12, No. 3, 2014, pp. 37-44.

Reardon, et al., "SoK: Secure Data Deletion," IEEE Symposium on Security and Privacy, 2013, pp. 305-315.

Cai, et al., "Program Interference in MLC NAND Flash Memory: Characterization, Modeling, and Mitigation" IEEE 31st International Conference on Computer Design, 2013, pp. 123-130.

"Understanding Flash: The Flash Translation Layer," flashdba, 2014.

Cai, et al., "Error Characterization, Mitigation, and Recovery in Flash-Memory-Based Solid-State Drives," IEEE, vol. 105, No. 9, 2017, pp. 1666-1704.

Grupp, et al., "Characterizing Flash Memory: Anomalies, Observations, and Applications," 2009 42nd Annual IEEE/ACM International Symposium on Micro Architecture, 2009, pp. 24-33.

Luo, et al., "Enabling Accurate and Practical Online Flash Channel Modeling for Modern MLC NAND Flash Memory," IEEE J. SEI. Areas Communication, vol. 34, No. 9, 2016, pp. 2294-2311.

Cai, et al., "Threshold Voltage Distribution in MLC NAND Flash Memory: Characterization, Analysis, and Modeling," 2013 Design, Automation Test in Europe Conference Exhibition, 2013, pp. 1285-1290.

Gutmann, et al., "Data Remanence in Semiconductor Devices," "USENIX Security Symposium, 2001.

Gutmann, et al., "Secure Deletion of Data from Magnetic and Solid-State Memory," USENIX Security Symposium, Focusing on Applications of Cryptography, vol. 6, 1996, pp. 1-17.

Skorobogatov, Data Remanence in Flash Memory Devices, Proceedings of the 7th International Conference on Cryptographic Hardware and Embedded Systems, 2005, pp. 339-353.

Biswajit Ray, U.S. Appl. No. 17/207,260, entitled, Systems and Methods for Runtime Analog Sanitation of Memory, filed Mar. 19, 2021.

* cited by examiner

US 12,307,097 B1

SYSTEMS AND METHODS FOR SANITIZATION OF MULTI-LEVEL CELL (MLC) MEMORY

CROSS REFERENCE TO RELATED APPLICATION

This application claims priority to Provisional Patent Application No. 63/305,006, entitled "Instant Data Sanitization on Multi-Level-Cell NAND Flash Memory" and filed on Jan. 31, 2022, which is incorporated herein by reference.

RELATED ART

Memory is an important element in a variety of electronic and computer applications. Memory may include volatile and nonvolatile memory. Volatile memory usually loses the data stored therein with a loss of power. Nonvolatile memory can preserve information even after power cycling.

Nonvolatile memory provides a great number of useful purposes, but can become a security concern when it comes time to disposal of data or disposal of the memory system itself. Many second-hand nonvolatile memory systems have been found to contain sensitive and confidential information about businesses, individuals, and government interests after being sold to third parties. Even memory systems thought to have been erased have been found to have sensitive and confidential information recoverable on them.

NAND flash memory is generally a very popular commercial nonvolatile memory (NVM) option due to its high density (greater than 1 terabyte (TB)/square inch) along with its relatively low cost (less than $1/gigabyte (GB)), lightweight and low power consumption, making it very attractive for a variety of electronic systems. Previously it had been thought that deleting files from flash drives was sufficient to remove sensitive and confidential information from them. However, when performing a deletion operation, many memory systems mark memory pages as invalid without actually removing or overwriting the data.

In this regard, flash memory is often arranged in blocks and pages where a single block may contain many pages of memory cells. The control circuitry is typically configured so that write and read operations may be performed on individual pages, but an erase operation can only be performed on blocks. That is, an individual page cannot be erased without erasing all of the pages in the same block. Thus, when the information in a page is deleted, the information is often marked as invalid but allowed to remain stored in the page until the block can be later erased. Prior to erasure of the block, the deleted information often remains recoverable.

To help ensure data sanitization, techniques have been developed that allow some information marked as invalid in a memory block to be erased while other information is retained. For example, it is possible to write valid information from a first memory block into a second memory block and to then erase the first memory block, thereby sanitizing the data marked as invalid. However, such techniques increase the number of program-erase (PE) cycles imposed on the memory, thereby degrading the memory.

Some data sanitization techniques have been used to try to overwrite some data in a memory block while retaining other data stored in the same memory block. For example, to sanitize a page of a block without affecting other pages, it is possible to program each cell of the page to be sanitized (e.g., write all 0's) such that all of the cells of such page are forced to a programmed state (e.g., storing a bit value of 0). Such techniques can be effectively used for single-level cell (SLC) memory but can create problems for multi-level cell (MLC) memory.

Specifically, an MLC generally refers to a memory cell that is capable of storing more than a single bit of information. Many flash memory systems are configured such that multiple pages share the same MLCs. Forcing all MLCs of a page to the same logical charge level affects the other pages that share the same MLCs. Thus, an operation to sanitize one page of MLC memory can result in the sanitization of data in other pages that share the same cells. This can undesirably limit the granularity at which such a sanitization operation may be performed.

Thus, improved techniques for sanitizing memory and, in particular, MLC memory are generally desired. It would be desirable for such techniques to be performed in a manner that prevents recovery of the sanitized data with conventional computer forensic techniques. Further, it would be desirable for such techniques to be low cost and compatible with existing memory systems and to be capable of sanitizing a single page of memory without necessarily sanitizing the data stored in other pages of the same memory block.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for performing sanitization of multi-level cell (MLC) memory. In some embodiments of the present disclosure, a memory controller is configured to read and buffer at least a first page of MLC memory that shares a plurality of MLCs with at least a second page. The memory controller then sanitizes the second page by performing at least one write operation to adjust the charge levels in the plurality of MLCs so that each bit of the second page is forced to the same value or to a value that mirrors (e.g. is inverted relative to) the value of another bit of the same cell. Thus, for multiple pages sharing the same MLCs, the data of at least one page can be sanitized while the data of at least one other page is retained. Such sanitizing can be achieved without having to perform an erase operation, thereby helping to prevent or reduce memory degradation.

Figure 1:
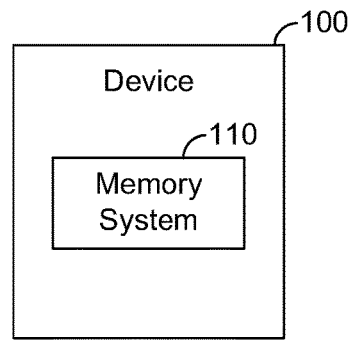
FIG. 1 is a block diagram illustrating an exemplary device with a flash memory.

FIG. 1 is a block diagram illustrating an exemplary device 100 with a memory system 110 for storing data. The device 100 may include, but is not limited to, smartphones, mobile devices, tablets, personal digital assistants, personal computers, game consoles, game cartridges, or other devices, and the memory system 110 may be a memory card, a Universal Serial Bus flash drive, a solid-state drive or other types of memory. In an exemplary embodiment, the memory system 110 may be a NAND flash architecture, although in other embodiments other types of devices 100 and other types of memory systems 110 are possible.

Figure 2:
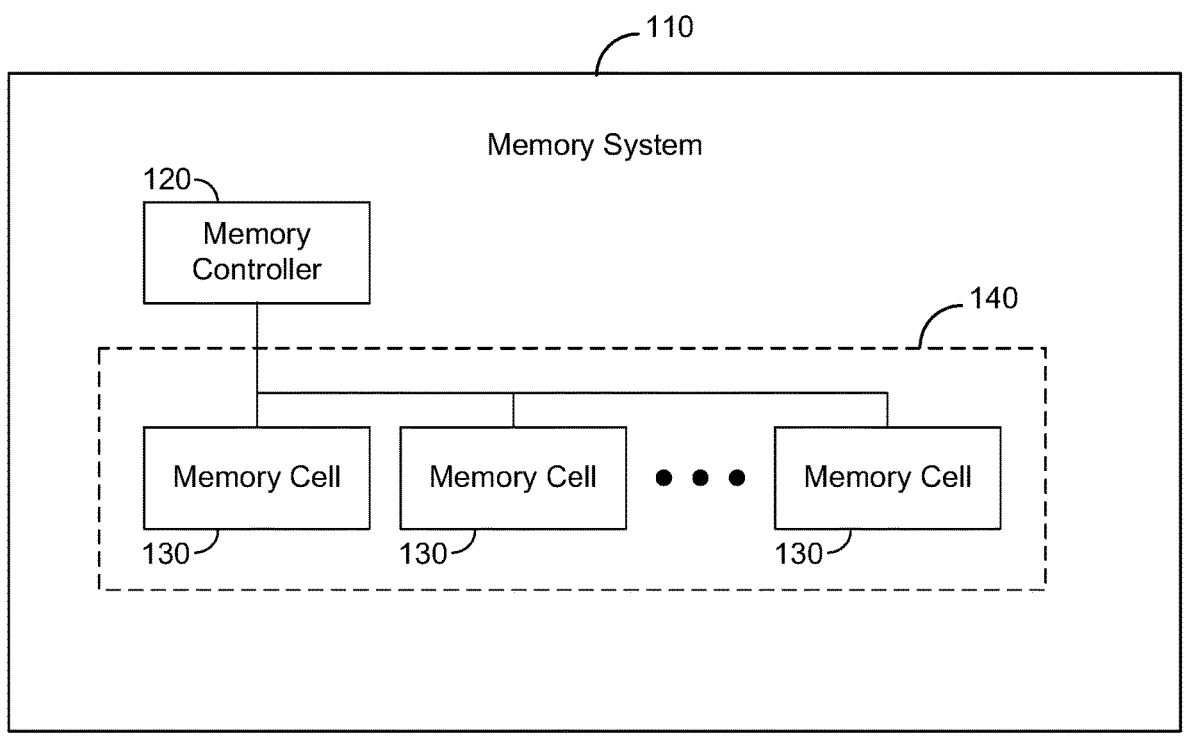
FIG. 2 is a block diagram illustrating an exemplary embodiment of a memory system.

FIG. 2 depicts a memory system 110 having a plurality of memory cells 130. In actuality, the memory system 110 may have any number of memory cells (e.g., from one to a trillion or more), but in FIG. 2, a few memory cells 130 are shown for simplicity of description. The memory cells 130 may be flash memory configured as NOR, NAND, VNAND or other types of arrangements. Unless otherwise indicated, it will be assumed that the memory cells shown by FIG. 2 and described herein are NAND flash memory cells, but it should be emphasized that other types of memory cells are possible (NOR flash, Resistive RAM, Ferroelectric RAM, etc.).

In addition, each cell 130 of the memory system 110 may be configured for storing a desired number of logical charge states per cell. Specifically, each memory cell 130 is a multi-level cell (MLC) for storing more than one bit of information. As known in the art and used herein, the term "MLC" refers to a memory cell capable of storing more than one bit (e.g., two bits or more) of information including triple-level cells (TLCs) that are configured to store three bits of information per cell and quad-level cells (QLCs) configured to store four bits of information per cell. For illustrative purposes, it will be assumed hereafter unless otherwise indicated that each memory cell 130 is an MLC that stores two bits of information, but it should be emphasized that each memory cell 10 may store a greater number of bits as may be desired.

As shown by FIG. 2, the memory cells 130 can be located on one or more memory chips 140. Within some classes of memory chips 140, memory cells are setup in blocks and pages. A page represents the smallest unit that can be programmed to a memory chip 140. A block represents the smallest unit that can be erased from a memory chip 140. In some embodiments, there are multiple pages within each block. Note that, in the context of memory operations, the terms "program" and "write" are synonymous, and these terms shall be used interchangeably herein.

As shown by FIG. 2, the memory cells 130 may be coupled to a memory controller 120 that is configured to perform memory operations, such as reading, erasing, and programming (i.e., writing) on the memory cells 130 similar to other memory controllers known in the art. The memory controller 120 may be implemented in hardware or a combination of hardware and software. As an example, the memory controller 120 may be implemented exclusively in hardware, such as an ASIC, a field programmable gate array (FPGA), or other type of circuitry configured to perform memory operations. In another example, the memory controller 120 may comprise a processor, such as digital signal processor (DSP) or central processing unit (CPU), that is configured to execute software to perform one or more functions of the memory controller 120.

As known in the art, memory operations may be performed by applying specific voltages on connections or "lines," such as word lines and bit lines, connected to one or more memory cells 130 as appropriate for performing the desired operation. In some embodiments, memory cells 130 may be located on one or more memory chips 140 (i.e., an integrated circuit chip with memory), and the memory controller 120 may be on a separate integrated circuit (IC) chip that is electrically coupled to the memory chip 140. The memory controller 120 may transmit to a memory chip 140 a request to perform a memory operation (e.g., a write, read, or erase operation), and the memory chip 140 may perform the requested operation by applying voltages as appropriate to the memory cells 130 of the memory chip 140.

Figure 3:
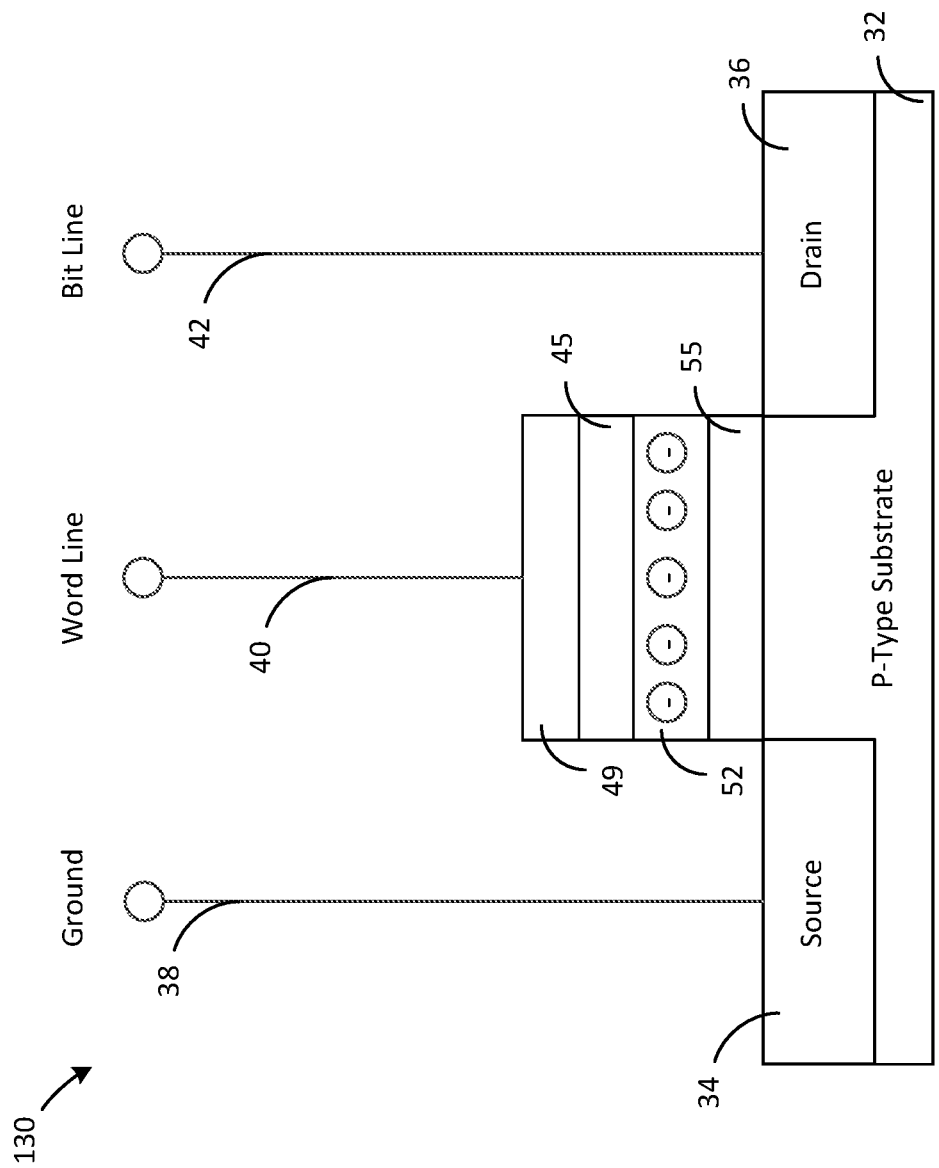
FIG. 3 is a block diagram illustrating an exemplary embodiment of a flash memory cell, such as is depicted by FIG. 2.

Flash memory is generally a type of non-volatile semiconductor memory that stores information in the form of charge on one or more floating gates 52. FIG. 3 depicts an exemplary embodiment of a flash memory cell 130, such as is depicted by FIG. 2. The memory cell 130 of FIG. 2 is depicted as essentially a standard flash memory cell and has a substrate 32, source 34, drain 36, ground line 38, word line 40, and bit line 42. The memory cell 130 has a blocking oxide 45 below the control gate 49 and tunnel oxide 55 below the floating gate 52. Voltage may be applied to the cell 130 via the lines 38, 40, 42 to perform read/erase/program operations. Structurally, a flash memory cell 130 comprises a floating gate metal-oxide-semiconductor field effect transistor (FG-MOSFET), which allows electrons from the silicon substrate 32 to be tunneled into the floating gate 52 during the program operation (e.g., by applying a large positive charge differential across the control gate 49 and the substrate 32), thereby increasing the charge in the floating gate 52. The erasure operation uses tunneling to remove electrons from the floating gate 52 to the substrate 32 (e.g., by applying a large negative charge differential across the control gate 49 and the substrate 32), thereby removing charge from the floating gate 52.

Figure 4:
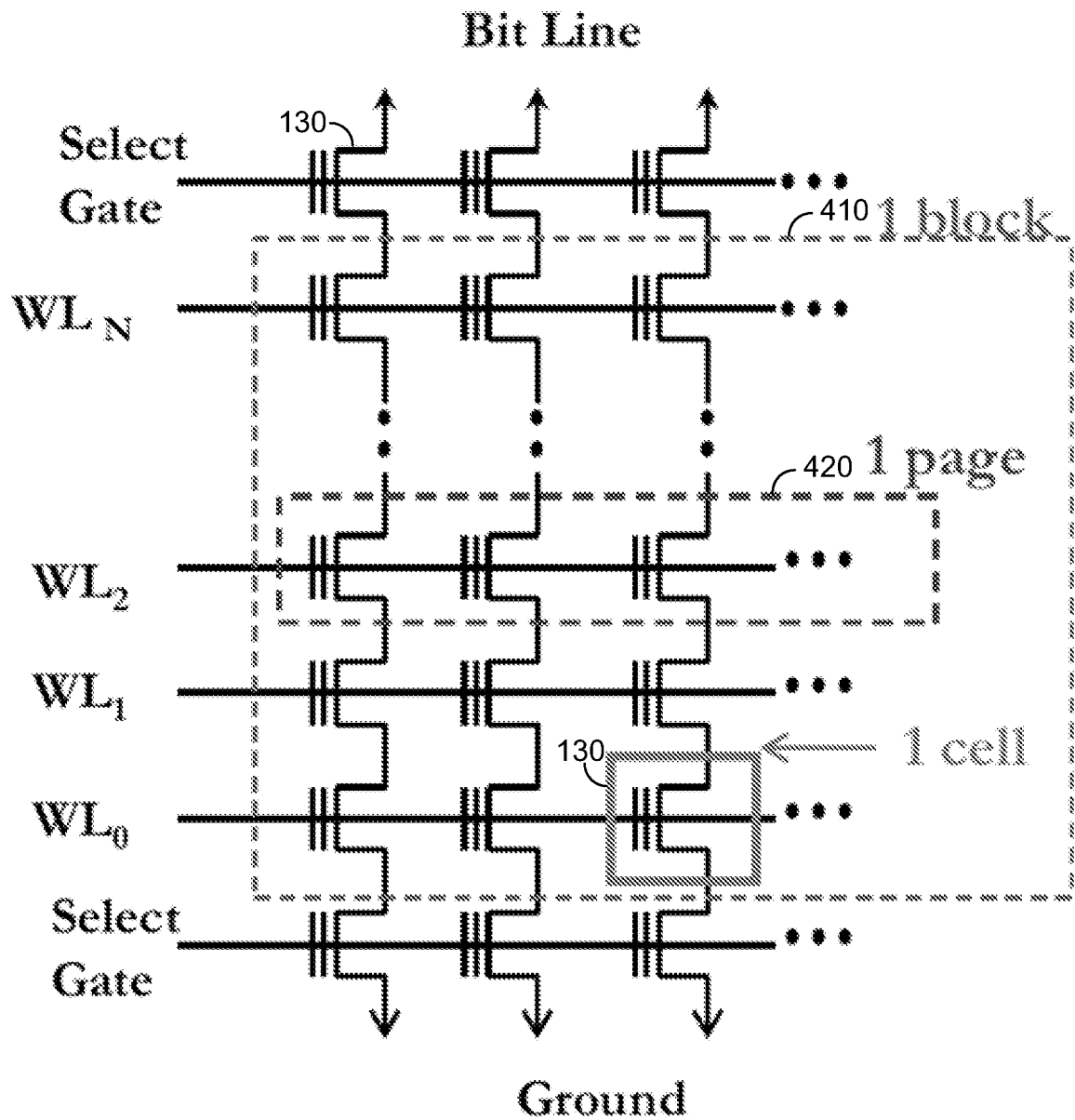
FIG. 4 is a diagram illustrating an exemplary NAND flash memory array of a memory chip depicted in FIG. 2 using cells depicted in FIG. 3.

FIG. 3 depicts a memory cell 130 of a memory chip 140, and FIG. 4 depicts an exemplary NAND flash memory array of memory cells 130. Flash memory chips 140 are generally arranged in one or more blocks 410. Each block 410 generally contains one or more pages 420 (e.g., a block may contain 32 pages). Each page generally holds one or more memory cells 130 representing bits (e.g., a page may contain 512 to 16 K memory cells plus additional cells for error correction). The values stored in memory cells 130 are changed through operations generally referred to as erasing and programming.

The erase operation in NAND flash typically involves setting a high voltage on the substrate 32 and a low voltage on all the control gates 49 of the block 410 causing electron tunneling from the floating gate 52, thereby removing charge from the floating gate 52. An erase operation often forces the bit value in a memory cell 130 to a logical high value (e.g., "1" for an SLC). Performance of the erase operation typically erases each memory cell 130 of the block being erased.

The program operation in NAND flash typically involves setting a high voltage on selected control gates 49 of the memory cells 130 of the page to be programmed and a low voltage on the substrate 32. This voltage differential causes electron tunneling to the floating gate 52 of the memory cells 130 to be programmed and not the other memory cells 130 of the page. Controlling the voltage on selected bit lines 42 and word lines 40 affects which page and memory cells 130 of a page 420 are programed. A program operation forces charge onto the floating gate 52 thereby increasing the amount of charge in the cell 130 until the amount of charge reaches the desired logical level, which corresponds to a particular value (i.e., the value being written to the cell 130).

In a program operation for a given memory cell 130, a reference voltage ($V_{ref}$) is applied to the memory cell 130 and charge is forced into the memory cell 130 until the measured voltage of the charge in the cell 130 is determined to exceed $V_{ref}$. Similarly, in a read operation, $V_{ref}$ is applied to the memory 130 to determine whether the voltage in the cell 130 is above or below $V_{ref}$, thereby indicating the data value stored in the cell 130.

Figure 5:
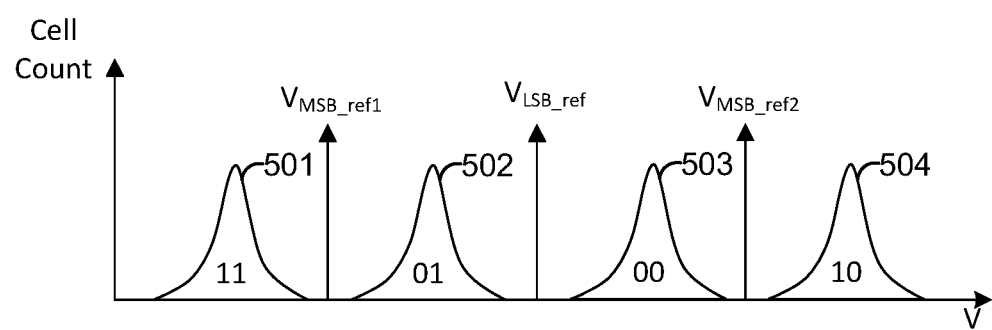
FIG. 5 illustrates exemplary voltage distributions of memory cells, such as is depicted by FIG. 2.

For an MLC, multiple reference voltages are used to define more logical charge levels relative to an SLC. As an example, FIG. 5 shows voltage distributions for different logical charge levels in memory cells 130 implemented as MLCs for storing two bits of information. Specifically, FIG. 5 shows a curve 501 representing an exemplary voltage distribution of cells 130 storing charge within a first logical charge level corresponding to a first binary value (e.g., "11"), a curve 502 representing an exemplary voltage distribution of cells 130 storing charge within a second logical charge level corresponding to a second binary value (e.g., "01"), a curve 503 representing an exemplary voltage distribution of cells 130 storing charge within a third logical charge level corresponding to a third binary value (e.g., "00"), and a curve 504 representing an exemplary voltage distribution of cells 130 storing charge within a fourth logical charge level corresponding to a fourth binary value (e.g., "10"). For illustrative purposes, it will be assumed hereafter unless otherwise indicated that the logical charge levels correspond to the binary values of "11," "01," "00," and "10," as described above and shown by FIG. 5. However, it is possible in other embodiments for any given logical charge level to correspond to a different binary value as may be desired.

As shown by FIG. 5, the different logical charge levels are associated with thresholds defined by different reference voltages applied to the cells 130. In this regard, when a cell 130 is storing charge at a voltage less than a first reference voltage, $V_{MSB\_ref1}$, then the cell 130 is at a logical voltage level described above as corresponding to a binary value of "11." When a cell 130 is storing charge at a voltage greater than $V_{MSB\_ref1}$ but less than a second reference voltage, $V_{LSB\_ref}$, then the cell 130 is at a logical voltage level described above as corresponding to a binary value of "01." When a cell 130 is storing charge at a voltage greater than $V_{LSB\_ref}$ but less than a third reference voltage, $V_{MSB\_ref2}$, then the cell 130 is at a logical voltage level described above as corresponding to a binary value of "00." When a cell 130 is storing charge at a voltage greater than $V_{MSB\_ref2}$, then the cell 130 is at a logical voltage level described above as corresponding to a binary value of "10."

Note that the different bits stored in a given cell 130 may be associated with different pages of memory that are separately accessible for reading and writing. For example, the most significant bit (MSB) of the binary value stored in each cell 130 of a group of cells 130 may be associated with a first page, referred to hereafter as the "MSB page," and the least significant bit (LSB) of the binary value stored in each cell 130 may be associated with a second page, referred to hereafter as the "LSB page." Thus, to read the LSB of the binary value stored in a cell 130, $V_{LSB\_ref}$ may be applied to the cell 130, and a determination is made whether the charge level in the cell 130 is above or below $V_{LSB\_ref}$. If the voltage of the charge stored in the cell 130 is below $V_{LSB\_ref}$, then the bit value of the LSB page read from the cell 130 is determined to be "1" as shown by FIG. 5. However, if the voltage of the charge stored in the cell 130 is above $V_{LSB\_ref}$, then the bit value of the LSB page read from the cell 130 is determined to be "0" as shown by FIG. 5.

Reading of the MSB of the binary value stored in the cell 130, however, may use multiple reference voltage comparisons. For example, to read the MSB of the binary value stored in a cell 130, $V_{MSB\_ref1}$ may be applied to the cell 130, and a determination is made whether the charge level in the cell 130 is above or below $V_{MSB\_ref1}$. If the voltage of the charge stored in the cell 130 is below $V_{MSB\_ref1}$, then the bit value of the MSB page read from the cell is determined to be "1" as shown by FIG. 5. However, if the voltage of the charge stored in the cell 130 is above $V_{MSB\_ref1}$, then $V_{MSB\_ref2}$ may be applied to the cell 130, and a determination is made whether the charge level in the cell 130 is above or below $V_{MSB\_ref2}$. If the voltage of the charge stored in the cell 130 is below $V_{MSB\_ref2}$ (i.e., such voltage is between $V_{MSB\_ref1}$ and $V_{MSB\_ref2}$, then the bit value of the MSB page read from the cell 130 is determined to be "0" as shown by FIG. 5. However, if the voltage of the charge stored in the cell 130 is above $V_{MSB\_ref2}$, then the bit value of the MSB page read from the cell 130 is determined to be "1" as shown by FIG. 5.

As indicated above, for pages sharing the same memory cells 130, the memory controller 120 is configured to allow sanitization of at least one page while retaining the data of at least one other page. As an example, the memory controller 120 may allow sanitization of a single page. Such sanitization can be achieved using normal read and write commands without requiring an erase operation, thereby helping to prevent memory degradation that otherwise could occur by performing program-erase (PE) cycles.

For example, to sanitize a first page, referred to hereafter as the "sanitized page," while retaining the data stored in a second page, referred to hereafter as the "retained page," the memory controller 120 is configured to read the retained page and buffer the read data (e.g., temporarily store the read data in a buffer or other form of memory). The memory controller 120 then issues at least one write command to force each bit of the sanitized page to a programmed state (e.g., write all 0's for the bits of the sanitized page) or to a state that is at least independent of the bit's original state, thereby sanitizing the data stored in the sanitized page.

An exemplary process for sanitizing a memory cell 130 of MLC memory for storing two bit values per cell will be described in more detail below.

For illustrative purposes, assume that two pages, an MSB page and an LSB page, share a group of memory cells 130 where the MSB page includes the most significant bit of each binary value stored in a cell 130 of the group and the LSB page includes the least significant bit of each binary value stored in a cell 130 of the group. Further assume that it is desirable to sanitize the data of the LSB page while retaining the data of the MSB page.

Figure 6:
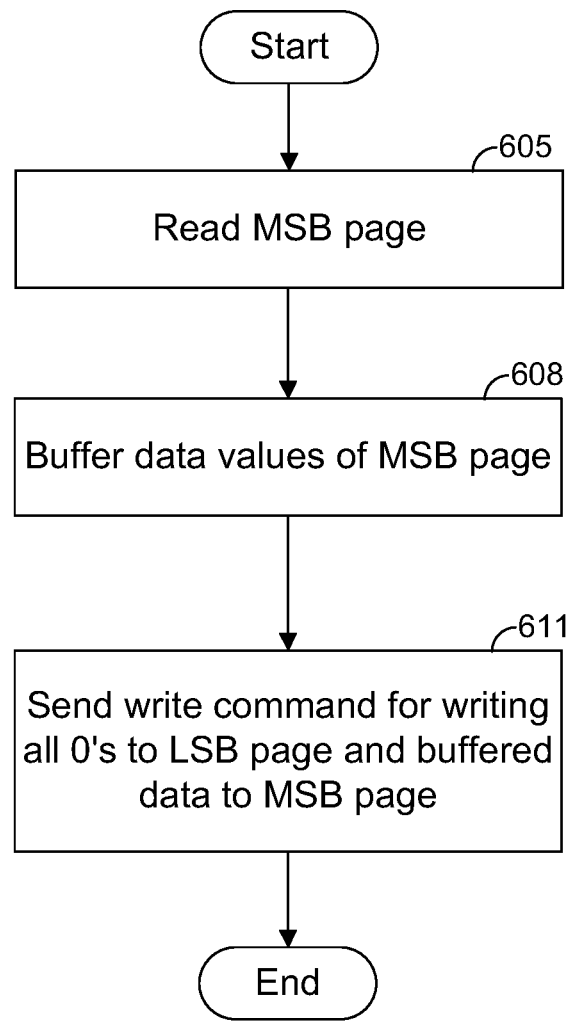
FIG. 6 is a flowchart illustrating an exemplary process of sanitizing a least significant bit (LSB) page of MLC memory.

Initially, the memory controller 120 is configured to read the MSB page, as shown by block 605 of FIG. 6. In this regard, the memory controller 120 is configured to transmit to the memory chip 140 a read command for reading the MSB page. In response, the memory chip 140 reads the MSB bit of the binary value stored in each memory cell 130 of the MSB page. The memory chip 140 further transmits the read values from the MSB page to the memory controller 120, which stores (e.g., buffers) the read values in memory local to the memory controller 120 or otherwise, as shown by block 608 of FIG. 6.

After the MSB page has been read, the memory controller 120 then sanitizes the LSB page. In this regard, the memory controller 120 may program each bit of the LSB page. That is, the memory controller 120 may be configured to transmit to the memory chip 140 at least one write command for writing a "0" to each bit of the LSB page and writing the buffered data to the MSB page, as shown by block 611 of FIG. 6. Specifically, the write command includes data to be written to the MSB page, and such data is the buffered data previously read from the MSB page. The write command also includes data to be written to the LSB page, and such data is set to all 0's in the current example. Thus, in response to the write command, for each memory cell 130 of the group of memory cells identified by the write command, the memory chip 140 forces charge into the cell 130 as appropriate to set the logical charge value in the cell 130 to a programmed state corresponding to a bit value of "0" for the LSB. In other words, the LSB of the binary value stored in the cell 130 is forced to a value of "0."

For example, referring to FIG. 5, if the binary value stored in the cell 130 is "11" or "10," the memory chip 140, in response to the write command sent in block 611, writes the binary value of "10" to the cell 130. Thus, the memory chip 140 forces charge into the cell 130 as appropriate until the voltage of the charge in the cell 130 exceeds $V_{MSB\_ref2}$. However, if the binary value stored in the cell 130 is "01" or "00," the memory chip 140, in response to the write command sent in block 611, writes the binary value of "00" to the cell 130. Thus, the memory chip 140 forces charge into the cell 130 until the voltage of the charge in the cell 130 exceeds $V_{LSB\_ref}$ such that the voltage is between $V_{LSB\_ref}$ and $V_{MSB\_ref2}$.

Therefore, if the binary value of "11" was originally stored in a cell 130 prior to the sanitization operation shown by FIG. 6, then such value is changed to a value of "10." If the binary value of "01" was originally stored in the cell 130 prior to the sanitization operation shown by FIG. 6, then such value is changed to a value of "00." If the binary value of "00" or "10" was originally stored in the cell 130 prior to the sanitization operation shown by FIG. 6, then such value is not changed by the sanitization operation. Thus, after performance of the sanitization operation, each LSB bit of the LSB page is programmed to the same logical value (i.e., "0") while the value of the MSB bit is retained.

Now assume that it is desirable to sanitize the data of the LSB page while retaining the data of the MSB page. Initially, the memory controller 120 is configured to read the LSB page, as shown by block 655 of FIG. 7. In this regard, the memory controller 120 is configured to transmit to the memory chip 140 a read command for reading the LSB page. In response, the memory chip 140 reads the LSB bit of the binary value stored in each memory cell 130 of the LSB page to form a data string, referred to hereafter as the "original LSB data." The memory chip 140 further transmits the original LSB data from the LSB page to the memory controller 120, which stores (e.g., buffers) the original LSB data in memory local to the memory controller 120 or otherwise, as shown by block 658 of FIG. 7.

After the LSB page has been read, the memory controller 120 then sanitizes the MSB page. However, for the MSB page, it is not possible to program all MSBs to a value of "0" without removing charge from at least some cells (e.g., cells 130 storing a binary value of "10"). In this regard, transitioning a cell 130 from a value of "10" to a value of "00" so that the MSB is transitioned to a programmed state (i.e., a "0" value) requires charge to be removed in order to reduce the logical charge level of the cell 130. Thus, rather than forcing all MSBs to a programmed state, as described above for the LSBs, the memory controller 120 controls bits of the MSB page such that they are independent of the original data values of the MSB page, thereby effectively sanitizing the original data values of the MSB page. For example, as will be described in more detail below, the memory controller 120 may control the bits of the MSB page such that each MSB bit mirrors (e.g., is inverted relative to) the LSB bit of the same memory cell 130.

In this regard, the memory controller 120 is configured to invert the original LSB data to form new data, referred to hereafter as the "inverted LSB data." That is, to form the inverted LSB data, the memory controller 120 changes each "1" of the original LSB data to a value of "0" and changes each "0" of the original LSB data to a value of "1." In other embodiments, the memory controller 120 may be configured to modify the LSB data in ways other than inverting.

Figure 7:
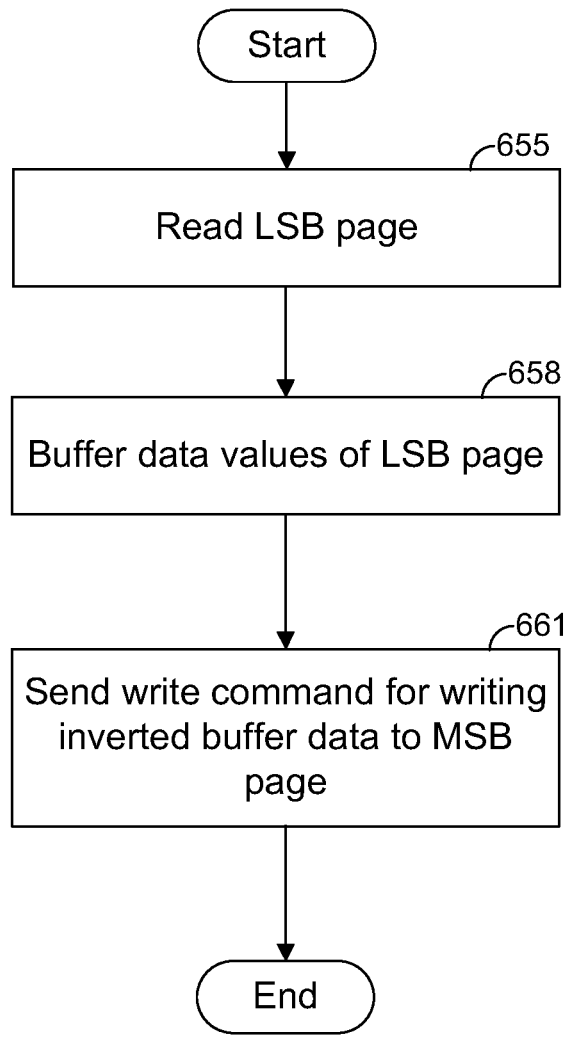
FIG. 7 is a flowchart illustrating an exemplary process of sanitizing a most significant bit (MSB) page of MLC memory.

The memory controller 120 is further configured to transmit to the memory chip 140 at least one write command for writing the original LSB data to the LSB page and the inverted LSB data to the MSB page, as shown by block 661 of FIG. 7. That is, for each memory cell 130, the memory controller 120 writes, to the LSB page, the original LSB value read from that cell 130 and writes, to the MSB page, the inverted form of such original LSB value. This can be achieved by transmitting to the memory chip 140 a write command that includes data to be written to the MSB page and data to be written to the LSB page. The data to be written to the MSB page may be the inverted LSB data, and the data to be written to the LSB page may be original LSB data read from the LSB page.

Thus, in the current example, the memory controller 120 instructs the memory chip 140 to write a binary value of "01" to a cell 130 if the original binary value in the cell 130 prior to the sanitization operation was "11" or "01." If the original binary value in the cell 130 prior to the sanitization operation was "00" or "10," then the memory controller 120 instructs the memory chip 140 to write a binary value of "10" to the cell. Thus, the binary value written to the cell 130 is a function of the cell's original LSB value, not the cell's original MSB value such that the binary value in the cell 130 after the sanitization operation is independent of the cell's original MSB value.

Therefore, if the binary value stored in a cell 130 is "11" or "01" such that the LSB has a value of "1," then the memory chip 140, in response to the write command, forces charge into the cell 130 until $V_{MSB\_ref1}$ is exceeded such that voltage of the charge in the cell 130 is between $V_{MSB\_ref1}$ and $V_{LSB\_ref}$ corresponding to a binary value of "01." However, if the binary value stored in the cell 130 is "00" or "10" such that the LSB has a value of "0," then the memory chip 140, in response to the write command, forces charge into the cell 130 until the voltage of the charge in the cell 130 exceeds $V_{MSB\_ref2}$ corresponding to binary value of "10."

Note that it is unnecessary for the memory controller 120 to resend the original LSB data to the memory chip 140 for the write operation described above. In this regard, such data can be copied internally by the memory chip 140 thereby obviating the need to resend it.

In addition, as noted above, performance of block 661 does not result in all bits of the MSB page being programmed to the same logical charge level and thus bit value, as described above for the LSB page for the process depicted by FIG. 6. However, the resulting state of the MSB stored in each cell 130 after performance of block 661 in FIG. 7 is no longer a function of the MSB originally stored in the cell 130 prior to the sanitization operation but rather is based on the value of the data of the LSB page, which is effective to sanitize the data of the MSB page.

Figure 8:
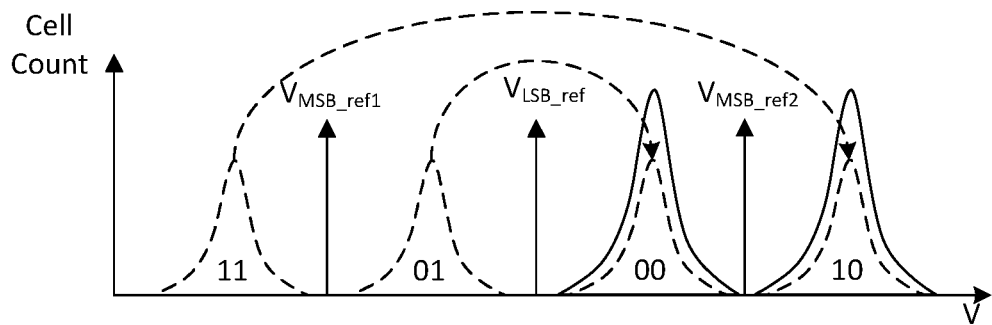
FIG. 8 illustrates exemplary voltage distributions of memory cells after a sanitization operation, such as is depicted by FIG. 6, is performed on the memory cells.

To better illustrate the exemplary processes described above, refer to FIGS. 5, 8 and 9. In this regard, FIG. 5 shows exemplary voltage distributions for a group of memory cells 130 prior to performing any sanitization operations. As shown by FIG. 5, some cells 130 have charge levels in each of the four possible logical charge levels corresponding to binary values of "00," "01," "00," and "10," as shown. When the sanitization operation shown by the process of FIG. 6 is performed, cells 130 having a logical charge level corresponding to "11" (i.e., less than $V_{MSB\_ref1}$) are forced to logical charge level corresponding to "10" (i.e., above $V_{MSB\_ref2}$), as shown by FIG. 8. Further, cells 130 having a logical charge level corresponding to "01" (i.e., between $V_{MSB\_ref1}$ and $V_{LSB\_ref}$) are forced to logical charge level corresponding to "00" (i.e., between $V_{LSB\_ref2}$ and $V_{MSB\_ref2}$), as shown by FIG. 8. Cells 130 having a logical charge level corresponding to "00" (i.e., between $V_{LSB\_ref}$ and $V_{MSB\_ref2}$) remain at such logical charge level, as shown by FIG. 8, and cells 130 having a logical charge level corresponding to "10" (i.e., above $V_{MSB\_ref2}$) remain at such logical charge level, as shown by FIG. 8.

Note that, in FIG. 8, the curves with dotted lines correspond to the voltage distributions of the cells 130 prior to performance of the sanitization operation of FIG. 6 while the curves with solid lines correspond to the voltage distributions of the cells 130 after performance of the sanitization operation of FIG. 6. As can be seen, each cell 130 is forced to either the logical charge level corresponding to "00" or the logical charge level corresponding to "10" depending on the bit value of the MSB page stored in the cell 130 prior to the sanitization operation. However, the LSB is forced to "O" effectively sanitizing the data of the LSB page.

Figure 9:
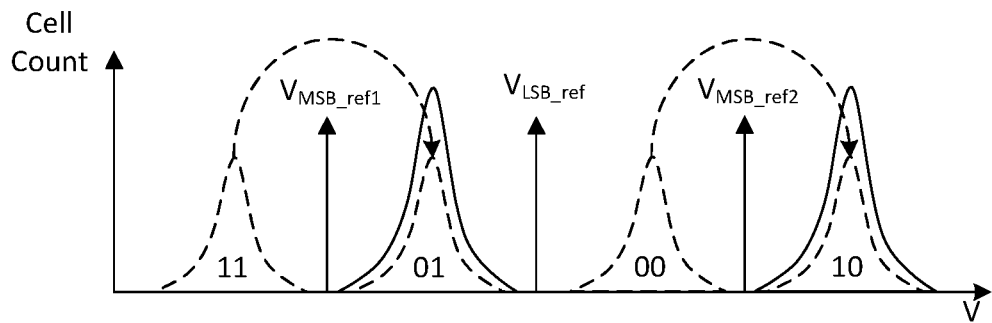
FIG. 9 illustrates exemplary voltage distributions of memory cells after a sanitization operation, such as is depicted by FIG. 7, is performed on the memory cells.

When the sanitization operation shown by the flow of FIG. 7 is applied to the cells 130 having the voltage distributions shown by FIG. 5, cells 130 having a logical charge level corresponding to "11" (i.e., less than $V_{MSB\_ref1}$) are forced to logical charge level corresponding to "01" (i.e., between $V_{MSB\_ref1}$ and $V_{LSB\_ref}$), as shown by FIG. 9. Further, cells 130 having a logical charge level corresponding to "01" (i.e., between $V_{MSB\_ref1}$ and $V_{LSB\_ref}$) remain at such logical charge level, as shown by FIG. 9. Cells 130 having a logical charge level corresponding to "00" (i.e., between $V_{LSB\_ref}$ and $V_{MSB\_ref2}$) are forced to logical charge level corresponding to "10" (i.e., above $V_{MSB\_ref2}$), as shown by FIG. 9. Cells 130 having a logical charge level corresponding to "10" (i.e., above $V_{MSB\_ref2}$) remain at such logical charge level, as shown by FIG. 9.

Note that, in FIG. 9, the curves with dotted lines correspond to the voltage distributions of the cells 130 prior to performance of the sanitization operation of FIG. 7 while the curves with solid lines correspond to the voltage distributions of the cells 130 after performance of the sanitization operation of FIG. 7. As can be seen, each cell 130 is forced to either the logical charge level corresponding to "01" or the logical charge level corresponding to "10" depending on the bit value of the LSB page stored in the cell 130 prior to the sanitization operation. However, the MSB is forced to either a "0" or "1" depending on the bit value of the LSB, effectively sanitizing the data of the MSB page.

Note that it is possible to sanitize both of the MSB and LSB pages by performing both processes shown by FIGS. 6 and 7. For example, the process shown by FIG. 6 can be performed to sanitize the LSB page, and the process shown by FIG. 7 can be performed to sanitize the MSB page. The memory controller 120 can also achieve such an outcome by sending to the memory chip 140 a write command for writing all 0's to the LSB page and all 1's to the MSB page. As a result of such sanitization operation, the voltage distributions of the cells 130 should appear as shown by FIG. 10 where all cells 130 are forced to the logical charge level corresponding with the binary value of "10." Specifically charge may be forced into each cell 130 as appropriate until the voltage of the charge in the cell 130 exceeds $V_{MSB\_ref2}$.

Figure 10:
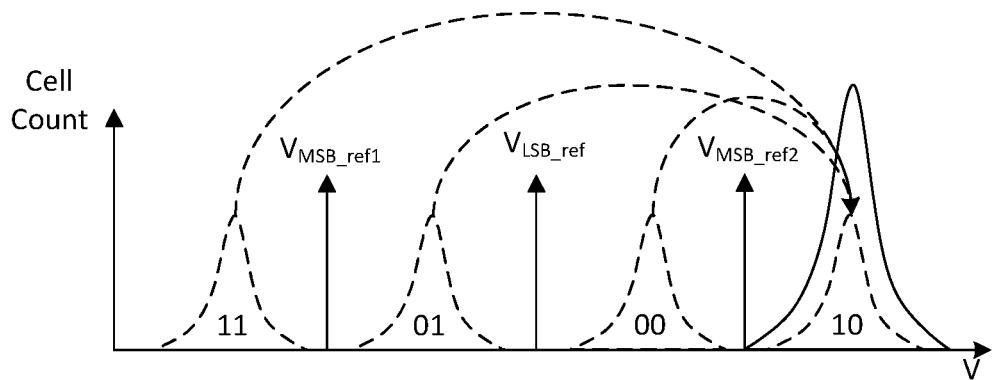
FIG. 10 illustrates exemplary voltage distributions of memory cells after an operation for sanitizing both an MSB page and an LSB page of MLC memory is performed on the memory cells.

FIG. 10 shows the voltage distributions of the cells 130 after performance of the operation described above to sanitize both the MSB page and the LSB page. Note that, in FIG. 10, the curves with dotted lines correspond to the voltage distributions of the cells 130 prior to performance of the sanitization operation while the curve with a solid line corresponds to the voltage distribution of the cells 130 after performance of the sanitization operation. As can be seen, each cell 130 is forced to the logical charge level corresponding to "01," thereby sanitizing the data of both the MSB page and the LSB page.

Various embodiments have been described above in the context of memory cells storing two-bit values. However, similar techniques can be employed on MLC memory storing any number of bits greater than two as may be desired in order to selectively sanitize one or more pages while retaining the data of one or more pages that share the same memory cells.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. For instance, the order of particular steps or the form of particular processes can be changed in some cases to perform equivalent steps. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The invention claimed is:

1. A memory system, comprising:
multi-level cell (MLC) memory having a plurality of memory cells shared by a first page of the MLC memory and a second page of the MLC memory, the first page storing first data and the second page storing second data; and
a memory controller configured to sanitize the second page without erasing the plurality of memory cells by performing at least one write operation to adjust charge levels in the plurality of memory cells so that, for each of the plurality of memory cells, a bit of the second page is forced to a value independent of the second data while ensuring that a bit of the first data is retained in the first page.

2. A memory system, comprising:
multi-level cell (MLC) memory having a plurality of memory cells shared by a first page of the MLC memory and a second page of the MLC memory, the first page storing first data and the second page storing second data; and
a memory controller configured to sanitize the second page without erasing the plurality of memory cells by performing at least one write operation to adjust charge levels in the plurality of memory cells so that each bit of the second page is forced to a value independent of the second data while the first data is retained in the first page, wherein the memory controller is configured to read the first data from the first page and perform the at least one write operation by transmitting a write command to a memory chip having the MLC memory, the memory command including data to be written to the first page and data to be written to the second page, wherein the data to be written to the first page is based on the first data read by the memory controller, and wherein each bit of the data to be written to the second page is set to 0.

3. A memory system, comprising:
multi-level cell (MLC) memory having a plurality of memory cells shared by a first page of the MLC memory and a second page of the MLC memory, the first page storing first data and the second page storing second data; and
a memory controller configured to sanitize the second page without erasing the plurality of memory cells by performing at least one write operation to adjust charge levels in the plurality of memory cells so that each bit of the second page is forced to a value independent of the second data while the first data is retained in the first page, wherein the memory controller is configured to read the first data from the first page, modify the first data to form modified data, and perform the at least one write operation by transmitting a write command to a memory chip having the MLC memory, the memory command including data to be written to the first page and data to be written to the second page, wherein the data to be written to the first page is based on the first data read by the memory controller, and wherein the data to be written to the second page is based on the modified data.

4. The system of claim 3, wherein the memory controller is configured to form the modified data by inverting the first data read from the first page.

5. A memory system, comprising:
multi-level cell (MLC) memory having a plurality of memory cells shared by a first page of the MLC memory and a second page of the MLC memory, the first page storing first data and the second page storing second data; and
a memory controller configured to sanitize the second page without erasing the plurality of memory cells by performing at least one write operation to adjust charge levels in the plurality of memory cells so that each bit of the second page is forced to a value independent of the second data while the first data is retained in the first page, wherein the memory controller is configured to read the first data from the first page and sanitize the second data by writing values to the second page based on the first data read from the first page.

6. A memory system, comprising:
multi-level cell (MLC) memory having a plurality of memory cells shared by a first page of the MLC memory and a second page of the MLC memory, the first page storing first data and the second page storing second data; and
a memory controller configured to sanitize the second page without erasing the plurality of memory cells by performing at least one write operation to adjust charge levels in the plurality of memory cells so that each bit of the second page is forced to a value independent of the second data while the first data is retained in the first page, wherein the memory controller is configured to read the first data from the first page, modify the first data to form modified data, and sanitize the second data by writing the modified data to the second page.

7. The system of claim 6, wherein the memory controller is configured to form the modified data by inverting the first data read from the first page.

8. A memory system, comprising:
multi-level cell (MLC) memory having a plurality of memory cells shared by a first page of the MLC memory and a second page of the MLC memory, the plurality of memory cells including at least a first memory cell and a second memory cell, the first memory cell storing a data value having a first bit associated with the first page and a second bit associated with the second page; and
a memory controller configured to perform a sanitization operation for sanitizing the second data without erasing the plurality of memory cells by performing at least one write operation to adjust charge levels in the memory cells so that each bit of the second page is forced to a value independent of the second data while ensuring that each bit of the first data is retained in the first page, wherein the memory controller in performing the sanitization operation is configured to force charge into the first memory cell to change the second bit without changing the first bit.

9. A memory system, comprising:
multi-level cell (MLC) memory having a plurality of memory cells shared by a first page of the MLC memory and a second page of the MLC memory, the plurality of memory cells including at least a first memory cell and a second memory cell, the first memory cell storing a data value having a first bit associated with the first page and a second bit associated with the second page; and
a memory controller configured to perform a sanitization operation for sanitizing the second data without erasing the plurality of memory cells by performing at least one write operation to adjust charge levels in the memory cells so that each bit of the second page is forced to a value independent of the second data while the first data is retained in the first page, wherein the memory controller in performing the sanitization operation is configured to force charge into the first memory cell to change the second bit without changing the first bit, and wherein the memory controller is configured to read the first data from the first page and perform the sanitization operation by writing a value to the first memory cell based on the first data read from the first page.

10. A memory system, comprising:
multi-level cell (MLC) memory having a plurality of memory cells shared by a first page of the MLC memory and a second page of the MLC memory, the plurality of memory cells including at least a first memory cell and a second memory cell, the first memory cell storing a data value having a first bit associated with the first page and a second bit associated with the second page; and a memory controller configured to perform a sanitization operation for sanitizing the second data without erasing the plurality of memory cells by performing at least one write operation to adjust charge levels in the memory cells so that each bit of the second page is forced to a value independent of the second data while the first data is retained in the first page, wherein the memory controller in performing the sanitization operation is configured to force charge into the first memory cell to change the second bit without changing the first bit, and wherein the memory controller is configured to read the first data from the first page, modify the first data to form modified data, and perform the sanitization operation by writing a value to the first memory cell based on the modified data.

11. The system of claim 10, wherein the memory controller is configured to form the modified data by inverting the first data read from the first page.

12. A method for sanitizing multi-level cell (MLC) memory, comprising:
storing first data in a first page of the MLC memory;
storing second data in a second page of the MLC memory, wherein the MLC memory has a plurality of memory cells shared by the first page and the second page; and
sanitizing, with a memory controller, the second page without erasing the plurality of memory cells by performing at least one write operation to adjust charge levels in the plurality of memory cells so that, for each of the plurality of memory cells, a bit of the second page is forced to a value independent of the second data while ensuring that a bit of the first data is retained in the first page.

13. A method for sanitizing multi-level cell (MLC) memory, comprising:
storing first data in a first page of the MLC memory;
storing second data in a second page of the MLC memory, wherein the MLC memory has a plurality of memory cells shared by the first page and the second page; and
sanitizing, with a memory controller, the second page without erasing the plurality of memory cells by performing at least one write operation to adjust charge levels in the plurality of memory cells so that each bit of the second page is forced to a value independent of the second data while the first data is retained in the first page, wherein the sanitizing comprises:
reading the first data from the first page; and
performing the at least one write operation by transmitting a write command to a memory chip having the MLC memory, the memory command including data to be written to the first page and data to be written to the second page, wherein the data to be written to the first page is based on the first data read from the first page, and wherein each bit of the data to be written to the second page is set to 0.

14. A method for sanitizing multi-level cell (MLC) memory, comprising:
storing first data in a first page of the MLC memory;
storing second data in a second page of the MLC memory, wherein the MLC memory has a plurality of memory cells shared by the first page and the second page; and
sanitizing, with a memory controller, the second page without erasing the plurality of memory cells by performing at least one write operation to adjust charge levels in the plurality of memory cells so that each bit of the second page is forced to a value independent of the second data while the first data is retained in the first page, wherein the sanitizing comprises:
reading the first data from the first page;
modifying the first data to form modified data; and
performing the at least one write operation by transmitting a write command to a memory chip having the MLC memory, the memory command including data to be written to the first page and data to be written to the second page, wherein the data to be written to the first page is based on the first data read by the memory controller, and wherein the data to be written to the second page is based on the modified data.

15. The method of claim 14, wherein the modifying comprises inverting the first data.

16. A method for sanitizing multi-level cell (MLC) memory, comprising:
storing first data in a first page of the MLC memory;
storing second data in a second page of the MLC memory, wherein the MLC memory has a plurality of memory cells shared by the first page and the second page; and
sanitizing, with a memory controller, the second page without erasing the plurality of memory cells by performing at least one write operation to adjust charge levels in the plurality of memory cells so that each bit of the second page is forced to a value independent of the second data while the first data is retained in the first page, wherein the sanitizing comprises:
reading the first data from the first page;
modifying the first data to form modified data; and
writing the modified data to the second page.

17. The method of claim 16, wherein the modifying comprises inverting the first data.

18. A method for sanitizing multi-level cell (MLC) memory, comprising:
storing first data in a first page of the MLC memory;
storing second data in a second page of the MLC memory, wherein the MLC memory has a plurality of memory cells shared by the first page and the second page; and
sanitizing, with a memory controller, the second page without erasing the plurality of memory cells by performing at least one write operation to adjust charge levels in the plurality of memory cells so that each bit of the second page is forced to a value independent of the second data while the first data is retained in the first page, wherein the sanitizing comprises:
reading the first data from the first page; and
writing values to the second page based on the first data read from the first page.

* * * * *